United States Patent
Andrews

(10) Patent No.: US 10,540,452 B1
(45) Date of Patent: Jan. 21, 2020

(54) AUTOMATED TRANSLATION OF APPLICATIONS

(71) Applicant: Amazon Technologies, Inc., Seattle, WA (US)

(72) Inventor: Brett Andrews, Olympia, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/014,761

(22) Filed: Jun. 21, 2018

(51) Int. Cl.
*G06F 17/28* (2006.01)
*G06F 9/455* (2018.01)
*G06F 9/451* (2018.01)
*G06F 16/17* (2019.01)

(52) U.S. Cl.
CPC ............ *G06F 17/289* (2013.01); *G06F 9/454* (2018.02); *G06F 9/45512* (2013.01); *G06F 16/173* (2019.01); *G06F 17/2836* (2013.01)

(58) Field of Classification Search
CPC ... G06F 7/00; G06F 7/06; G06F 9/454; G06F 9/45512; G06F 16/173; G06F 17/27; G06F 17/28; G06F 17/289; G06F 17/2836; G06F 17/30; G06F 15/16; G06F 17/22
USPC ....... 382/182; 704/2, 3, 4, 5, 8, 9, 270, 275, 704/277; 705/345; 707/736; 715/201, 715/234, 264, 703; 717/109, 104
See application file for complete search history.

(56) References Cited

U.S. PATENT DOCUMENTS

| | | | | |
|---|---|---|---|---|
| 5,568,383 A * | 10/1996 | Johnson | ............... | G06F 17/289 704/2 |
| 5,848,386 A * | 12/1998 | Motoyama | ............ | G06F 17/272 704/5 |
| 5,917,484 A * | 6/1999 | Mullaney | ................ | G06F 17/27 704/8 |
| 5,983,182 A * | 11/1999 | Moore | .................... | G09F 27/00 704/270 |
| 5,987,402 A * | 11/1999 | Murata | ................. | G06F 17/289 704/2 |
| 6,092,036 A * | 7/2000 | Hamann | ................. | G06F 9/454 704/8 |
| 6,139,201 A * | 10/2000 | Carbonell | ............... | G06F 17/21 704/2 |
| 6,526,426 B1* | 2/2003 | Lakritz | ............... | G06F 17/2258 704/8 |
| 6,598,015 B1* | 7/2003 | Peterson | ............. | G06F 17/2827 704/3 |

(Continued)

*Primary Examiner* — Gerald Gauthier
(74) *Attorney, Agent, or Firm* — Lee & Hayes, P.C.

(57) ABSTRACT

This disclosure describes providing and improving upon automated techniques for translating words presented by an application from one natural language into one or more different natural languages. In some examples, the techniques include obtaining a file that includes strings that have been stripped out, copied, or otherwise obtained from source code of an application. Further, the techniques include automating the communication of the strings to a translator service, and the receipt of translated strings from the translator service that have been translated into one or more natural languages. Additionally, one or more files may be generated to store the translated strings according to the natural languages to which the strings were translated. Finally, the files including the translated strings may be stored in a location, such as a repository, where they may be provided to clients of the application according to the natural languages of the clients.

20 Claims, 10 Drawing Sheets

(56) References Cited

U.S. PATENT DOCUMENTS

| | | | | |
|---|---|---|---|---|
| 7,110,938 B1* | 9/2006 | Cheng | G06F 17/2818 | 704/2 |
| 7,139,696 B2* | 11/2006 | Tokieda | G06F 17/289 | 704/8 |
| 7,292,987 B2* | 11/2007 | Flanagan | G06F 17/2229 | 704/2 |
| 7,356,458 B1* | 4/2008 | Gonos | G06F 17/218 | 704/8 |
| 7,496,230 B2* | 2/2009 | Chen | G06F 9/543 | 382/182 |
| 7,512,532 B2* | 3/2009 | Kimpara | G06F 17/289 | 704/277 |
| 7,716,037 B2* | 5/2010 | Precoda | G06F 17/289 | 704/2 |
| 8,082,144 B1* | 12/2011 | Brown | G06F 17/243 | 379/201.1 |
| 8,886,518 B1* | 11/2014 | Wang | G06F 17/2818 | 704/1 |
| 9,300,727 B2* | 3/2016 | Ongg | H04L 67/10 | |
| 10,235,353 B1* | 3/2019 | Sanders | G06F 17/271 | |
| 2001/0029455 A1* | 10/2001 | Chin | G06F 17/273 | 704/277 |
| 2002/0069196 A1* | 6/2002 | Betros | G06F 21/6245 | |
| 2002/0077805 A1* | 6/2002 | Hecht | G06F 17/2809 | 704/2 |
| 2002/0169592 A1* | 11/2002 | Aityan | G06F 17/289 | 704/2 |
| 2003/0009320 A1* | 1/2003 | Furuta | G06F 17/2836 | 704/2 |
| 2003/0033589 A1* | 2/2003 | Reyna | G06F 9/45512 | 717/109 |
| 2003/0115552 A1* | 6/2003 | Jahnke | G06F 9/454 | 715/201 |
| 2004/0168132 A1* | 8/2004 | Travieso | G06F 17/289 | 715/264 |
| 2004/0260532 A1* | 12/2004 | Richardson | G06F 17/2836 | 704/2 |
| 2006/0116865 A1* | 6/2006 | Cheng | G06F 17/2836 | 704/2 |
| 2006/0136824 A1* | 6/2006 | Lin | G06F 17/2836 | 715/264 |
| 2006/0200766 A1* | 9/2006 | Lakritz | G06F 15/00 | 715/234 |
| 2008/0127045 A1* | 5/2008 | Pratt | G06F 9/454 | 717/104 |
| 2008/0133216 A1* | 6/2008 | Togami | G06F 9/454 | 704/4 |
| 2008/0281804 A1* | 11/2008 | Zhao | G06F 16/31 | |
| 2008/0300863 A1* | 12/2008 | Smith | G06F 17/289 | 704/9 |
| 2009/0125497 A1* | 5/2009 | Jiang | G06F 16/3337 | |
| 2009/0132230 A1* | 5/2009 | Kanevsky | G06F 17/289 | 704/2 |
| 2010/0121629 A1* | 5/2010 | Cohen | G06F 17/28 | 704/2 |
| 2011/0126098 A1* | 5/2011 | Jellison, Jr. | G06F 17/289 | 715/703 |
| 2012/0253785 A1* | 10/2012 | Hamid | G06F 17/2229 | 704/4 |
| 2012/0284014 A1* | 11/2012 | Zivkovic | G06F 17/289 | 704/3 |
| 2013/0173247 A1* | 7/2013 | Hodson | G06F 17/28 | 704/4 |
| 2013/0297284 A1* | 11/2013 | Choi | G06F 17/28 | 704/2 |
| 2014/0067361 A1* | 3/2014 | Nikoulina | G06F 17/2818 | 704/2 |
| 2014/0156282 A1* | 6/2014 | Madere | G06F 17/27 | 704/275 |
| 2014/0163952 A1* | 6/2014 | Brawer | G06F 17/2223 | 704/5 |
| 2014/0200878 A1* | 7/2014 | Mylonakis | G06F 17/2818 | 704/4 |
| 2014/0278343 A1* | 9/2014 | Tran | G06F 17/2785 | 704/2 |
| 2015/0261880 A1* | 9/2015 | Luo | H04L 67/10 | 707/736 |
| 2016/0170973 A1* | 6/2016 | Zhang | G06Q 50/01 | |
| 2016/0179481 A1* | 6/2016 | Ohara | G06F 9/454 | 717/109 |
| 2017/0046333 A1* | 2/2017 | Mirkin | G06F 17/289 | |
| 2017/0262416 A1* | 9/2017 | Rezgui | G06F 17/211 | |

\* cited by examiner

500 ─┐

```
┌─────────────────────────────────────────────────────────────────────────────┐
│ PROVIDE A COMPUTING DEVICE WITH ACCESS TO A COMMAND-LINE INTERFACE (CLI) TO RECEIVE │
│ COMMANDS FROM THE COMPUTING DEVICE, THE COMPUTING DEVICE BEING ASSOCIATED WITH AN   │
│                          APPLICATION DEVELOPER                              │
│                                     502                                     │
└─────────────────────────────────────────────────────────────────────────────┘
                                      ↓
┌─────────────────────────────────────────────────────────────────────────────┐
│ RECEIVE, VIA THE CLI AND FROM THE COMPUTING DEVICE, A COMMAND TO TRANSLATE FIRST   │
│ APPLICATION STRINGS INCLUDED IN A FIRST DATA FILE, THE FIRST APPLICATION STRINGS BEING IN │
│      A FIRST NATURAL LANGUAGE AND ASSOCIATED WITH SOURCE CODE OF AN APPLICATION    │
│                                     504                                     │
└─────────────────────────────────────────────────────────────────────────────┘
                                      ↓
┌─────────────────────────────────────────────────────────────────────────────┐
│ RECEIVE, VIA THE CLI AND FROM THE COMPUTING DEVICE, AN INDICATION THAT THE FIRST DATA │
│                       FILE IS STORED IN A REPOSITORY                        │
│                                     506                                     │
└─────────────────────────────────────────────────────────────────────────────┘
                                      ↓
┌─────────────────────────────────────────────────────────────────────────────┐
│ SEND, TO A TRANSLATION SERVICE, THE INDICATION THAT THE FIRST APPLICATION STRINGS  │
│ INCLUDED IN THE FIRST DATA FILE AS STORED IN THE REPOSITORY AT LEAST PARTLY RESPONSIVE │
│                           TO RECEIVING THE COMMAND                          │
│                                     508                                     │
└─────────────────────────────────────────────────────────────────────────────┘
                                      ↓
┌─────────────────────────────────────────────────────────────────────────────┐
│ RECEIVE, FROM THE TRANSLATION SERVICE, SECOND APPLICATION STRINGS THAT ARE IN A    │
│ SECOND NATURAL LANGUAGE, WHEREIN INDIVIDUAL STRINGS OF THE SECOND APPLICATION      │
│    STRINGS ARE TRANSLATIONS OF INDIVIDUAL STRINGS OF THE FIRST APPLICATION STRINGS │
│                                     510                                     │
└─────────────────────────────────────────────────────────────────────────────┘
                                      ↓
┌─────────────────────────────────────────────────────────────────────────────┐
│           GENERATE A SECOND DATA FILE INCLUDING THE SECOND APPLICATION STRINGS     │
│                                     512                                     │
└─────────────────────────────────────────────────────────────────────────────┘
                                      ↓
┌─────────────────────────────────────────────────────────────────────────────┐
│                     STORE THE SECOND DATA FILE IN THE REPOSITORY            │
│                                     514                                     │
└─────────────────────────────────────────────────────────────────────────────┘
```

```
┌─────────────────────────────────────────────────────────────────────────┐
│ IDENTIFY A FIRST DATA FILE INCLUDING A FIRST STRING ASSOCIATED WITH SOURCE │
│   CODE OF AN APPLICATION, THE FIRST STRING BEING IN A FIRST NATURAL LANGUAGE │
│                                   602                                    │
└─────────────────────────────────────────────────────────────────────────┘
                                     │
                                     ▼
┌─────────────────────────────────────────────────────────────────────────┐
│ DETECT AN EVENT ASSOCIATED WITH TRANSLATING THE FIRST STRING FROM THE FIRST │
│          NATURAL LANGUAGE INTO A SECOND NATURAL LANGUAGE                │
│                                   604                                    │
└─────────────────────────────────────────────────────────────────────────┘
                                     │
                                     ▼
┌─────────────────────────────────────────────────────────────────────────┐
│              CAUSE THE FIRST STRING TO BE SENT TO A TRANSLATION SERVICE              │
│                                   606                                    │
└─────────────────────────────────────────────────────────────────────────┘
                                     │
                                     ▼
┌─────────────────────────────────────────────────────────────────────────┐
│    RECEIVE, FROM THE TRANSLATION SERVICE, A SECOND STRING IN THE SECOND │
│    NATURAL LANGUAGE, THE SECOND STRING BEING A TRANSLATION OF THE FIRST │
│                                  STRING                                  │
│                                   608                                    │
└─────────────────────────────────────────────────────────────────────────┘
                                     │
                                     ▼
┌─────────────────────────────────────────────────────────────────────────┐
│                 GENERATE A SECOND DATA FILE INCLUDING THE SECOND STRING                 │
│                                   610                                    │
└─────────────────────────────────────────────────────────────────────────┘
                                     │
                                     ▼
┌─────────────────────────────────────────────────────────────────────────┐
│  CAUSE THE SECOND DATA FILE TO BE STORED IN A REPOSITORY ASSOCIATED WITH │
│                   THE SOURCE CODE OF THE APPLICATION                     │
│                                   612                                    │
└─────────────────────────────────────────────────────────────────────────┘
```

FIG. 6

AUTOMATED TRANSLATION OF APPLICATIONS

BACKGROUND

Service providers offer cloud-based services to fulfill users' computing-service needs without the users having to invest in and maintain computing infrastructure required to implement the services. These service providers may provide network-based computing resources and functionality to implement various types of cloud-based services, such as scalable-storage services, computer-processing services, application-platform services, and so forth. In some examples, developers may utilize application-platform services offered by the service provider to run their applications using virtual servers (or "instances") provisioned on various configurations of hardware-based resources of a cloud-based service platform. The application-platform services may be provisioned in geographically disparate data centers in order to quickly and efficiently serve users of the applications that are hosted by the cloud-based service platform.

However, users of the applications often speak and read using a variety of different natural languages than the natural language in which the application was developed. In order to enable users that speak and read using different natural languages, it may be desirable to translate the language of words presented to users by the applications into different natural languages.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of an example method for automating the translation of strings of an application from one natural language into one or more other natural languages.

FIG. 6 illustrates a flow diagram of another example method for automating the translation of strings of an application from one natural language into one or more other natural languages.

DETAILED DESCRIPTION

Figure 1:
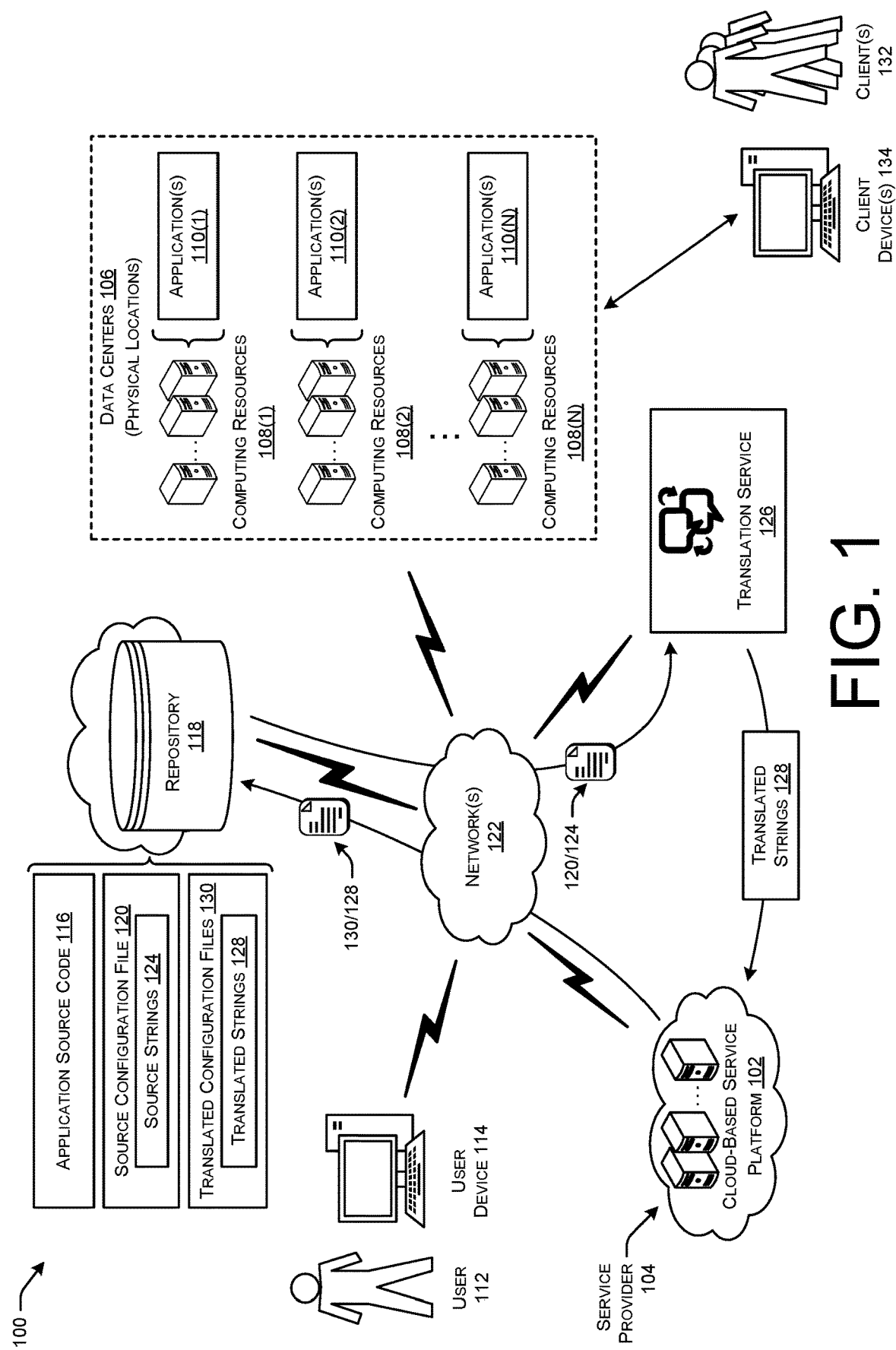
FIG. 1 illustrates a system-architecture diagram of an example environment in which an automated-translation service performs operations to automate the translation of strings of an application from one natural language into one or more different natural languages.

This disclosure describes, at least in part, providing and improving upon automated techniques for translating words presented by an application from one natural language into one or more different natural languages (e.g., English to French). In some examples, the techniques include obtaining a file that includes strings that have been stripped out, copied, or otherwise obtained from source code of an application. Further, the techniques include automating the communication of the strings to a translator service, and the receipt of translated strings from the translator service that have been translated into one or more natural languages. Additionally, one or more files may be generated to store the translated strings according to the natural languages to which the strings were translated. Finally, the files including the translated strings may be stored in a location, such as a repository, where they may be provided to clients of the application according to the natural languages of the clients. In this way, techniques for translating strings of applications may be automated utilizing a specific set of rules to solve a problem rooted in computer technology.

In some examples, the techniques described herein may be performed by one or more components of an automated-translation service that is provided by a cloud-based service platform. For example, a user (e.g., application developer) may have registered for an account with the cloud-based service platform to subscribe for the use of various computer-based services, such as application-hosting services. The user may be an application developer that has developed a software application using a single natural language. However, to increase the use and popularity of their application, the developer may desire to have the application's strings that are presented on a display be translated into a variety of other natural languages to reach a wider audience of customers or clients. In such examples, the developer may strip, or otherwise copy, strings that are embedded in the source code of their application and move them into a configuration file, which may be organized using key-value mapping. The developer may then desire to utilize the automated-translation service provided by the cloud-based service platform, and send the configuration file to a translation service to be translated.

The user may generate or create the configuration file that includes the list of strings that have been stripped from the application's source code, and may store the configuration file at a location accessible to the translation service, and also available to the applications that are hosted in the application-hosting platform, such as a repository and/or at a user device. The automated-translation service may then detect an event indicating that the strings included in the configuration file are to be translated into one or more other natural languages.

In some examples, the automated-translation service may provide the user or developer with access, via their user account, to a command-line interpreter (CLI) that receives, among other input, commands indicating requests to translate the strings. For instance, the user may utilize their credentials to log in to their user account, and provide a command via the CLI that instructs the automated-translation service to begin the translation process. Additionally, the user may provide an indication of a storage location of the configuration file that includes the strings (e.g., a storage location at the repository, a storage location at an on-premise user device, etc.).

In other examples, the automated-translation service may detect an indirect event that indicates that the automated-translation service is to automatically translate the strings into one or more other natural languages. For instance, the automated-translation service may detect that the developer, or another entity, has updated and/or added source code to a repository that stores the application's source code. In such examples, the automated-translation service may determine to translate the strings because a new string may have been added, and/or a previously translated string may have been modified. In another example, the automated-translation service may translate the strings at regularly scheduled times that are defined according to a schedule. Because translator services continue to be updated and improved upon, it may be advantageous for the automated-translation service to periodically have the strings retranslated to receive a more accurate translation of the strings into the other natural languages.

Once the automated-translation service has determined that the strings are to be translated, the automated-translation service may begin interacting with a translator service to obtain translated strings. The translator service may similarly be managed, operated, and/or provided by the cloud-based service platform, and/or may be a third-party translator service that is utilized by the automated-translation service. The automated-translation service may begin the automated process of having the strings translated into different natural languages. For example, the automated-translation service may cause the user device and/or repository to begin sending each of the strings included in the configuration file (e.g., in parallel, serialized, batches, and/or any combination thereof) to the translator service to be translated into one or more other natural languages. In some instances, the automated-translation service may specify which natural languages the strings are to be translated into, and in other examples, the automated-translation service may have the strings translated into every natural language that the translator service supports. The automated-translation service may receive, from the translator service, translated strings that have been translated into various natural languages. The automated-translation service may further generate additional configuration files to store the translated strings according to the natural languages to which the translated strings have been translated. In this way, the automated-translation service may generate respective configuration files for each of the sets of translated strings that are grouped based on the natural language of the sets.

Upon generating the configuration files for each of the natural languages that the strings were translated into, the automated-translation service may determine to store the additional configuration files in a location accessible by various entities. For instance, the applications that are hosted in the application-hosting platform may have knowledge of a location, such as a repository, at which the configuration files are stored, and obtain the appropriate configuration files based on the natural language of the client device accessing the applications.

In this way, the automated-translation service may automate, and improve upon, techniques for translating strings of applications into various natural languages. Traditionally, a user may have to manually find a translator service, package the strings, send them off to the translator service, receive translations of the strings, package the translated strings into respective files, and store the files in an appropriate location or repository. However, the techniques described herein include the use of a specific set of rules configured to cause a computing device, or a system of devices, to automate operations that computing device(s) were previously unable to perform. Moreover, the techniques described herein improve the functioning of computing devices in various ways, and improve upon techniques previously performed by humans. For example, the techniques described herein include programming one or more devices to efficiently identify translation services, and more efficiently communicate strings to and from the translation services. Further, the techniques include generating specific types of files, and storing the translated strings in the appropriate files for use by applications. Additionally, the techniques include automating the detection of events that indicate that strings should be translated, or retranslated, to improve the ability of applications to output translations of strings from applications, and also to output more accurate translations of application strings.

As described herein, the term "natural language" generally refers to a human language that has developed naturally in use of humans, in contract to artificial languages or computer languages. Examples of natural languages include English, Chinese, French, and so forth. Additionally, the term natural language may include fictional languages used by humans, such as languages from movies and/or television shows (e.g., alien languages such as "Klingon"), fictional languages from the media (e.g., "pirate" language), and/or any other type of fictional language. Further, the term "applications" may include any type of software and/or firmware based component that may present textual data in a natural language, such as from strings. For instance, applications may include web applications, websites, mobile applications, command-line interfaces (CLIs), scripts, application programming interfaces (APIs), operating systems, and/or any other type of software component or application. Additionally, the techniques described herein may be utilized in other scenarios, such as documentation, text-to-speech, and so forth. For example, the techniques may be utilized by voice-processing systems to translate audio data representing voice commands in a natural language into another natural language for further processing (e.g., natural language understanding to determine an intent). Similarly, text-to-speech engines may utilize the techniques described herein to translate text generated in one natural language into another natural language.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an automated-translation service of a cloud-based service platform 102 performs operations to automate the translation of strings of an application from one natural language into one or more different natural languages.

As illustrated in the example environment 100, the cloud-based service platform 102 may comprise cloud-based devices and may be operated and managed by a service provider 104. The cloud-based service platform 102 may further include, or otherwise be associated with, the computing-resource platform, which may include data centers 106 that each include one or more computing resources 108(1), 108(2), to 108(N) where "N" is any integer greater than 2 (referred to herein collectively as "computing resources 108"). The data centers 106 may be located across disparate geographical regions such that computing resources 108 are available to support functionality for cloud-based services provided via the cloud-based service platform 102. The data centers 106 may be provisioned in a cloud-based computing platform associated with the cloud-based service provider 104. Additionally, or alternatively, the data centers 106 may be on-premise data centers 106 at least partly maintained and/or managed by a user of the cloud-based service platform 102. Even further, the data centers 106 may additionally, or alternatively, be provisioned in cloud-based computing platforms associated with separate cloud-based service providers. The cloud-based service platform 102, which may include the data centers 106, may comprise servers that do not require end-user knowledge of the physical location and configuration of the system that delivers the services. Common expressions associated with the cloud-based service platform 102 may include "on-demand computing," "software as a service (SaaS)," "platform computing," "network-accessible platform," "cloud services," "data centers," and so forth. Services provided by the cloud-based service platform 102 may be distributed across one or more physical or virtual devices.

The computing resources 108 may include various combinations of hardware-based components, such as central processing units, memory, storage, network capacity, and/or any other type of hardware-based resource to support cloud-based services. In some examples, the computing resources 106 may further include respective memories that store various firmware-based and/or software-based resources that provide the functionality of the services, such as one or more operating systems, one or more applications 110(1)-(N), and so forth. The operating system(s), application(s) 110, and/or other components stored in the memories, may provide functionality for implementing an application designed by an application developer, and/or the services provided by the service provider 104, such as scalable-storage services, computer-processing services, application-hosting services, and so forth.

To utilize the services provided by the service provider 104, users 112 may register for an account with the cloud-based service platform 102. For instance, users 112 may utilize a user device 114 to interact with an identity and access management (IAM) component that allows the users 112 to create accounts with the cloud-based service platform 102. The registered users 112 may then request the use of various services, such as application-hosting services (e.g., hosting applications 110 in the computing resources 108), automated-translation services, translation services, and so forth.

The cloud-based service platform 102 may further include a systems-manager component to allow the users 112 to manage their cloud-based services that are provisioned/supported in the computing-resource platform. The systems-manager component may comprise a unified interface that allows users 112 to centralize operational data and automate tasks across their computing resources 108. The systems-manager component may reduce the time to detect and resolve operational problems in the cloud-based service infrastructure. The systems-manager component may give users 112 a complete view of cloud-based service performance and configuration, simplifies resource and application management, and simplifies operating and managing the cloud-based service at scale.

In some examples, the user 112 may comprise an application developer, an administrator or principle associated with an application, and/or another entity that manages the applications 110. The user 112 may publish, store, or otherwise place application source code 116 for their applications 110 in a repository 118. The repository 118 may comprise a central computing location in which application source code 116 is stored, managed, published, and so forth. The repository 118 may, in some examples, comprise an application-development platform where the application source code 116 may be hosted, reviewed, managed, published, and/or otherwise accessed by other developers. In some examples, the repository 118 may be owned by, operated by, managed by, or otherwise associated with the service provider 104, while in other examples, the repository 118 may be associated with a third party.

Along with other components, the cloud-based service platform 102 may include an automated-translation component configured to automate translations of strings of applications into different natural languages. To do so, the user 112 may create a source configuration file 120 that includes one or more source strings that are embedded in application source code 116. Source strings may comprise any kind of string that includes text data that may be presented at least partly according to a natural language format, structure, semantics, etc., by the application 110 on a display. The source configuration file 120 may include the source strings arranged in any format, such as key-value string pairs, a list, etc. Further, the source configuration file 120 may comprise any type of file defined according to any format, such as JavaScript Object Notation (JSON) format, a ".properties" file extension, MessageFormat, YAML format, and/or any other machine-readable format.

The user 112 may store the source configuration file 120 in one or more locations, such as local to their user device 114, and/or in the repository 118 along with the application source code 116. For instance, the user device 114 may send the source configuration file and/or the source strings 124 to be stored in the repository 118 over one or more networks 122, which may include any one or, or combination of, personal area networks (PANs), wired and wireless local area networks (LANs), wired and wireless wide area networks (WANs), and so forth. Regardless of where the source configuration file 120 and/or source strings 124 are store, the cloud-based service platform 102 may cause the source configuration file 120, which includes the source strings 124 that are embedded in the application source code 116, to be sent to a translation service 126. As described in more detail with respect to FIGS. 2-4, the cloud-based service platform 102 may detect an event that indicates that the cloud-based service platform 102 is to cause the source strings 124 to be translated, such as receiving a command via a CLI, detecting a change, update, and/or addition to the application source code 116 in the repository, and/or detecting a scheduled event.

In some examples, the cloud-based service platform 102 may, at least partly or indirectly, cause the source configuration file 120 itself, or the source strings 124 on their own, to be sent to one or more translation services 126. In some examples, the translation service 126 may be a service provided, hosted, managed, operated, or otherwise associated with the cloud-based service platform 102, and in other examples, the translation service 126 may be associated with a third-party provider. In further, examples, the translation service 126 may be owned, operated, managed, etc., as an on-premise service of the user 112.

The translation service 126 may be configured, or trained, to perform any technique for translating data from one natural language into one or more different natural languages. As a specific example, the translation service 126 may use machine-learning technologies to provide on-demand translation. The translation service 126 may include an encoder which reads a source string 124 one at a time and constructs a semantic representation that captures the meaning of the source string 124. Further, the translation service 126 may include a decoder which uses the semantic representation to generate a translation one word at a time in the target, natural language. The translation service 126 may continue to generate words until the source string 124 is interpreted. The translation service 126 may receive the entire source configuration file 120, and/or the source strings 124 individually, and translate the source strings 124 into translated strings 128. The translation service 126 may translate the source strings 124 in parallel and/or as a batch process, or may serialize the translation of the source strings 124 as they are received. The translation service 126 may then return the translated strings 128 in one or more natural languages. The translation service 126 may simply translate and return the translated strings 128 in every natural language that is supported by the translation service 126, and in other examples, the translation service 126 may receive an indication of one or more specific natural languages to which the source strings 124 are to be translated.

In some examples, the translation service 126 may comprise an automated, machine-learning based translation service. However, in some examples the translation service 126 may comprise a human-based translation service where one or more human translators go through and translate the source strings 124 into the translated strings 128. Although a single translation service 126 may be utilized, in some examples, multiple translations services 126 may be utilized to translate the source strings 124 into translated strings 128. For instance, one translation service 126 may only provide certain translations for certain languages, and that service may be supplemented by another translation service 126 that provides other translations.

The cloud-based service platform 102 (e.g., the automated-service component) may generate translated configuration files 130 for each of the natural languages which include the corresponding translated strings 128. In some examples, the source configuration file 120 and/or the translated configuration files 130 may be stored in a database associated with cloud-based service platform 102, in the repository 118, and/or in another storage location that is known and accessible to entities that require use of the source strings 124 and translated strings 128 (e.g., applications 110). For instance, the source configuration file 120, source strings 124, translated configuration files 130, and/or translated strings 128 may all be stored in a same location as the application source code 116, such as in a repository 118.

In this way, when clients 132 desire to interact with the applications 110 via their client devices 134, the applications 110 (or other entity, such as a web browser, operating system, etc.) may determine a natural language that is appropriate for the client device 132. The appropriate source strings 124 and/or translated strings 128 may be selected to be embedded in the application source code 116 for use by the applications 110 depending on the natural language of the client 132 and/or client devices 134. In various examples, the network(s) 122 may communicatively connect various entities to each other, such as the cloud-based service platform 102, the user device 114, the repository 118, the data centers 106, the translation service 126, and/or the client device(s) 134. In some examples, the source configuration file 120, source strings 124, translated configuration files 130, and/or translated strings 128 may all be downloaded and stored local to the client devices 134. For instance, in examples where the client device 134 downloads an application 110 to their client devices 134, the client device 134 may also download the source configuration file 120, source strings 124, translated configuration files 130, and/or translated strings 128.

Figure 2:
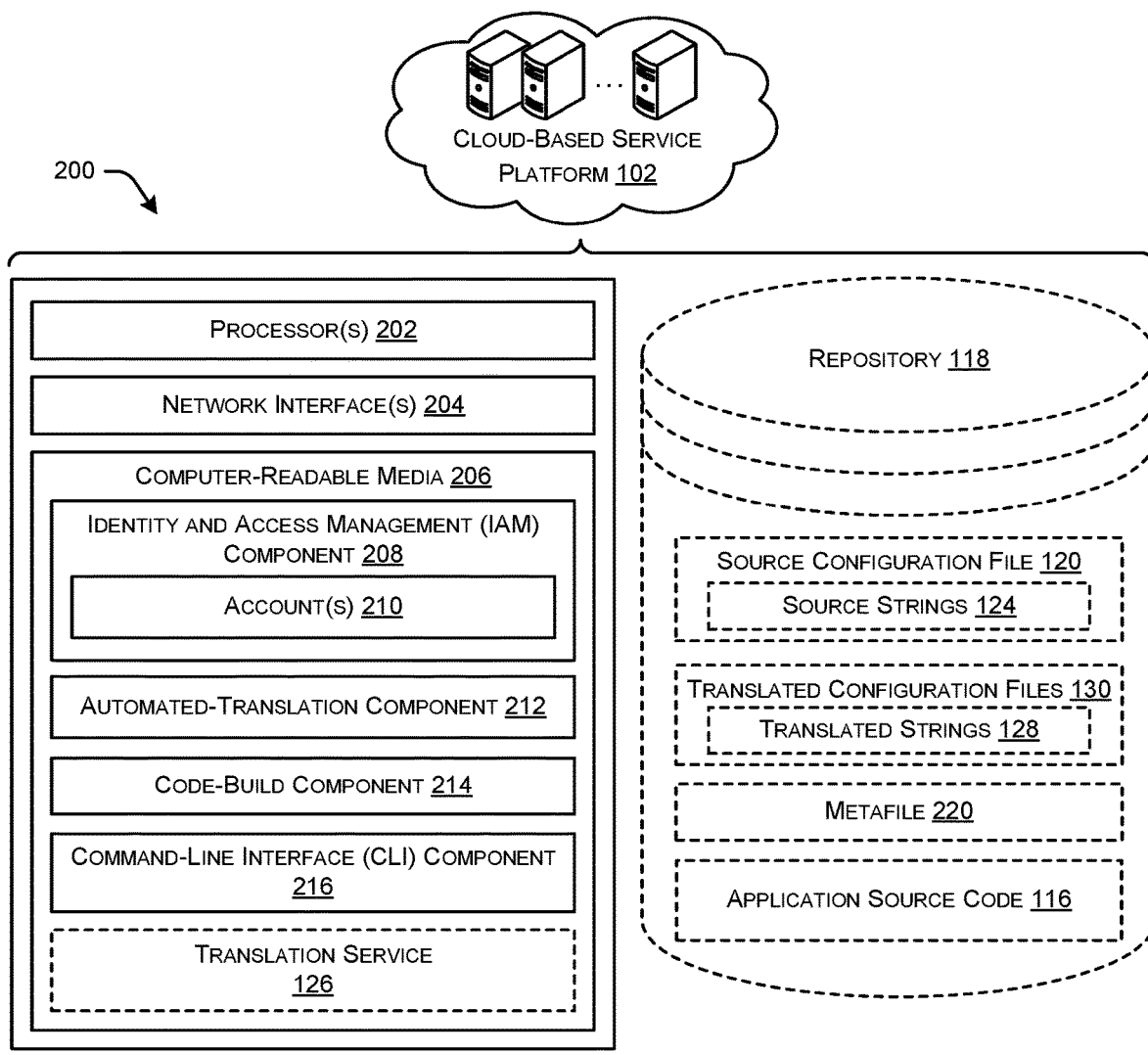
FIG. 2 illustrates a component diagram of an example cloud-based service platform that includes components to automate the translation of strings of an application from one natural language into one or more different natural languages.

FIG. 2 illustrates a component diagram 200 of an example cloud-based service platform 102 that includes components to automate the translation of strings of an application from one natural language into one or more different natural languages.

As illustrated, the cloud-based service platform 102 may include one or more hardware processors 202 (processors) configured to execute one or more stored instructions. The processor(s) 202 may comprise one or more cores. Further, the cloud-based service platform 102 may include one or more network interfaces 204 configured to provide communications between the cloud-based service platform 102 and other devices, such as the user device 114, the repository 118, the translation service 126, the data centers 106, and so forth. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The cloud-based service platform 102 may also include computer-readable media 206 that stores various executable components (e.g., software-based components, firmware-based components, etc.). The computer-readable media 206 may store an identity and access management (IAM) component 208. To utilize the services provided by the service provider 104, users 112 may register for an account with the cloud-based service platform 102. For instance, users 112 may utilize their user devices 114 to interact with the identity and access management (IAM) component 208 that allows the users 112 to create an account 210 with the cloud-based service platform 102. Generally, the IAM component 208 may enable users 112 to manage access to their cloud-based services and computing resources 108 securely. Using the IAM component 208, users 112 can provide input, such as commands, regarding the translation of their source strings 124. Each user 112 that is permitted to interact with services associated with a particular account 210 may have a user identity/profile assigned to them. In this way, users 112 may log in with sign-in credentials to their account(s) 210, and any changes or operations performed by that user 112 may be tracked for that user identity for auditing purposes.

The computer-readable memory 206 may further store an automated-translation component 212 configured to perform, or cause performance of, various operations for automating the translation of source strings 124 into translated strings 128. For example, the automated-translation component 212 may send and receive data between various devices, such as the source configuration file 120, source strings 124, generate the translated configuration files 130, communicate the translated strings 128, and/or perform other operations for automating the translation of the source strings 124. In some examples, the automated-translation component 212 may communicate with various components, store data, and perform some, or all, of the operations required for performing the translation techniques described herein.

The computer-readable memory 206 may store a code-build component 214. The code-build component 214 may be configured to detect changes to the application source code 116, such as updates, modifications, removals, additions, etc. The code-build component 214 may detect a change and execute a bode-build run. For example, the code-build component 214 may compile the application source code 116, run tests, produce software packages for deployment, etc. Further, the code-build component 214 may include software to initiate a translation, and/or retranslation, of the source strings 124 upon detecting any type of changes to the application source code 116.

The computer-readable media 206 may store a command-line interface (CLI) component 216 configured to provide a user 112 with a means of interacting with programs running on the cloud-based service platform 102. For example, the user 112 may utilize their user device 114 to provide a command via the CLI component 216 to translate, and/or retranslate, the source strings 124. Additional commands may be input and interpreted using a CLI provided by the CLI component 216, such as an indication of natural languages to translate into, directories to store the translated configuration files 130, etc. In some examples, the CLI component 216 may additionally, or alternatively receive commands and other data via means other than a CLI. For instance, the CLI component 216 may receive data via a software development kit (SDK), an application programming interface (API), and/or any other portal or electronic means by which commands and/or other data may be received. Thus, as described herein, the techniques described with reference to a CLI may be equally applicable to other electronic input means, such as an SK, an API, and/or any other electronic portal or interface.

As shown in FIG. 2, the cloud-based service platform 102 may, in some examples, include or provide the translation service 126. For instance, the cloud-based service platform 102 may manage and operate a translation service 126 that is utilized by the automated-translation component 212 to translate the source strings 124. However, in some examples the translation service 126 may be operated, managed, or otherwise associated with a third-party provider and/or as an on-premise service managed by the user 112.

The cloud-based service platform 102 may further include the repository 118 for persistently storing and managing data, and may comprise a series of bytes that is managed by a database management system (DBMS). The repository 118 may store various data, such as one or more source configuration files 120 with associated source strings 124, and one or more translated configuration files 130 with associated translated strings 128. Further, the repository 118 may include a metafile 220 that may be generated and updated by the automated-translation component 212. The metafile 220 may track what source strings 124 have been translated in the past, or at a previous time, into a translated string 128. In some examples, the automated-translation component 212 may analyze the metafile upon determining whether to translate all of the source strings 124. For instance, the automated-translation component 212 may determine, based on the metafile 220, that at least one of the source strings 124 has already been translated into a translated string 128, and/or was not modified, and refrain from causing the at least one source strings 124 from being retranslated. In this way, the metafile 220 may be utilized to save processing requirements by refraining from retranslating source strings 124 that do not require retranslation.

In some examples, the metafile 220 may further specify other data. For instance, the metafile may indicate a location (e.g., directory, repository 118, etc.) at which the source strings 124 are stored. In this way, the automated-translation component 212 and/or the translation service 126 may simply utilize the metafile 220 to determine the location of the source strings 124 rather than receiving an indication of the location as a parameter via a CLI of the CLI component 216. Further, the metafile 220 may include an indication of one or more source strings 124 and/or translated strings 128 that are not to be translated again. For example, the user 112 may already have a translation for one of the source strings 124 and/or the translated strings 128, and may indicate that the string is not to be retranslated for that string because the user 112 desires the current translation.

As illustrated, the cloud-based service platform may, in some examples, include manage, or provide the repository 118 that stores the application source code 116. For instance, the cloud-based service platform 102 may manage and operate the repository 118 that is utilized to store application source code 116. However, in some examples the repository 118 may be operated, managed, or otherwise associated with a third-party provider.

Figure 3:
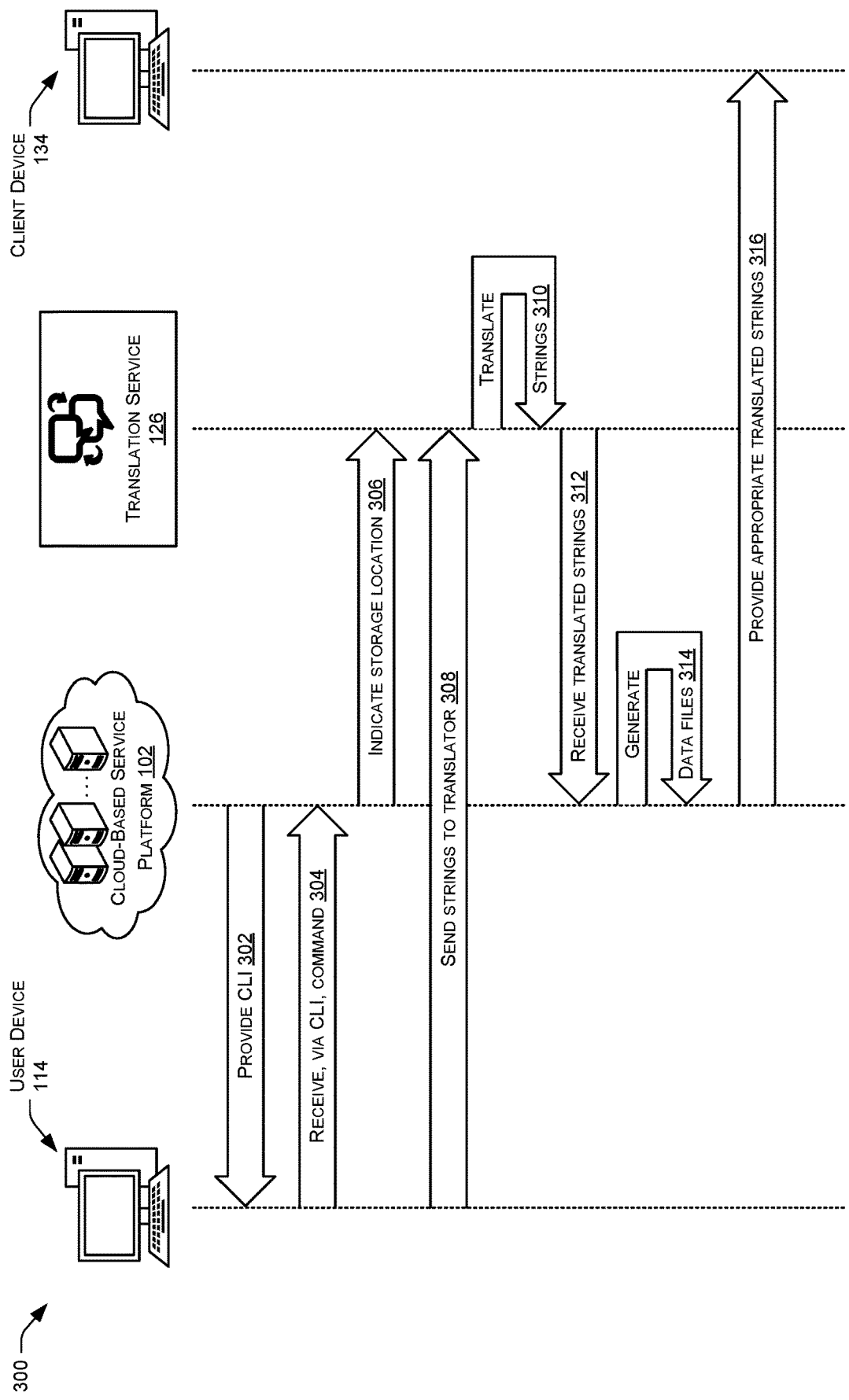
FIG. 3 illustrates a sequence flow diagram showing example communications between different devices and/or components to automate the translation of strings of an application.

FIG. 3 illustrates a sequence flow diagram 300 showing example communications between different devices and/or components to automate the translation of strings of an application.

At 302, the cloud-based service platform 102 may provide the user device 114 with access to a command-line interpreter (CLI). For instance, CLI component 216 may allow a user 112 of the user device 114 to access, using their credentials of their account 210, a CLI to provide commands to components or software associated with the cloud-based service platform 102.

At 304, the cloud-based service platform 102 may receive, via the CLI, a command. For example, the user 112 may utilize their user device 114 to input a command that is readable and/or executable by the CLI to perform an operation. In some examples, the command may comprise an instruction to translate, and/or retranslate, the source strings 124. In some examples, the user device 114 may further provide, via the CLI, an indication of a location at which the source strings 124 are stored. For instance, the user device 114 may indicate that the source strings 124 are stored local to the user device 114, and/or at a directory and/or repository 118.

At 306, the cloud-based service platform 102 may provide an indication of the storage location of the source strings 124 to the translation service 126. In this way, the translation service 126 knows where to obtain the source strings 124 in order to translate the source strings 124.

In some examples, the command 304 may be sent directly to the translation service 126 such that the translation service 126 received the storage location at 306 via the command provided via the CLI.

At 308, the user device 114 may send the source strings 124 to the translator service 126. In some examples, the cloud-based service platform 102 may cause the user device 114 to send the source configuration file 120, and in other examples, the cloud-based service platform 102 may cause the user device 114 to send the source strings 124 individually (e.g., at least partly in parallel, serialized, or a combination thereof). In some examples, the translation service 126 may retrieve, or obtain, the source strings 124 from the user device 114. However, in some examples the source strings 124 may be stored in a repository 118 rather than at the user device 114, and be communicated to the translation service 126 from the repository 118 at step 308.

At 310, the translation service 126 may translate the source strings 124 into one or more natural languages. In this way, the translation service 126 may generate translated strings 128 which correspond to the source strings 124, but translated into a different natural language.

At 312, the cloud-based service platform 102 may receive the translated strings 128 from the translation service 126. The cloud-based service platform 102 may receive the translated strings at least partly in parallel, at least partly serialized, or a combination thereof.

At 314, the cloud-based service platform 102 may generate translated configuration files 130 which include, list, map, etc., respective translated strings 128 according to their respective natural languages.

At 316, the cloud-based service platform 102 may provide an appropriate translated string 128 to a client device 134 that is interacting with an application 110.

Figure 4:
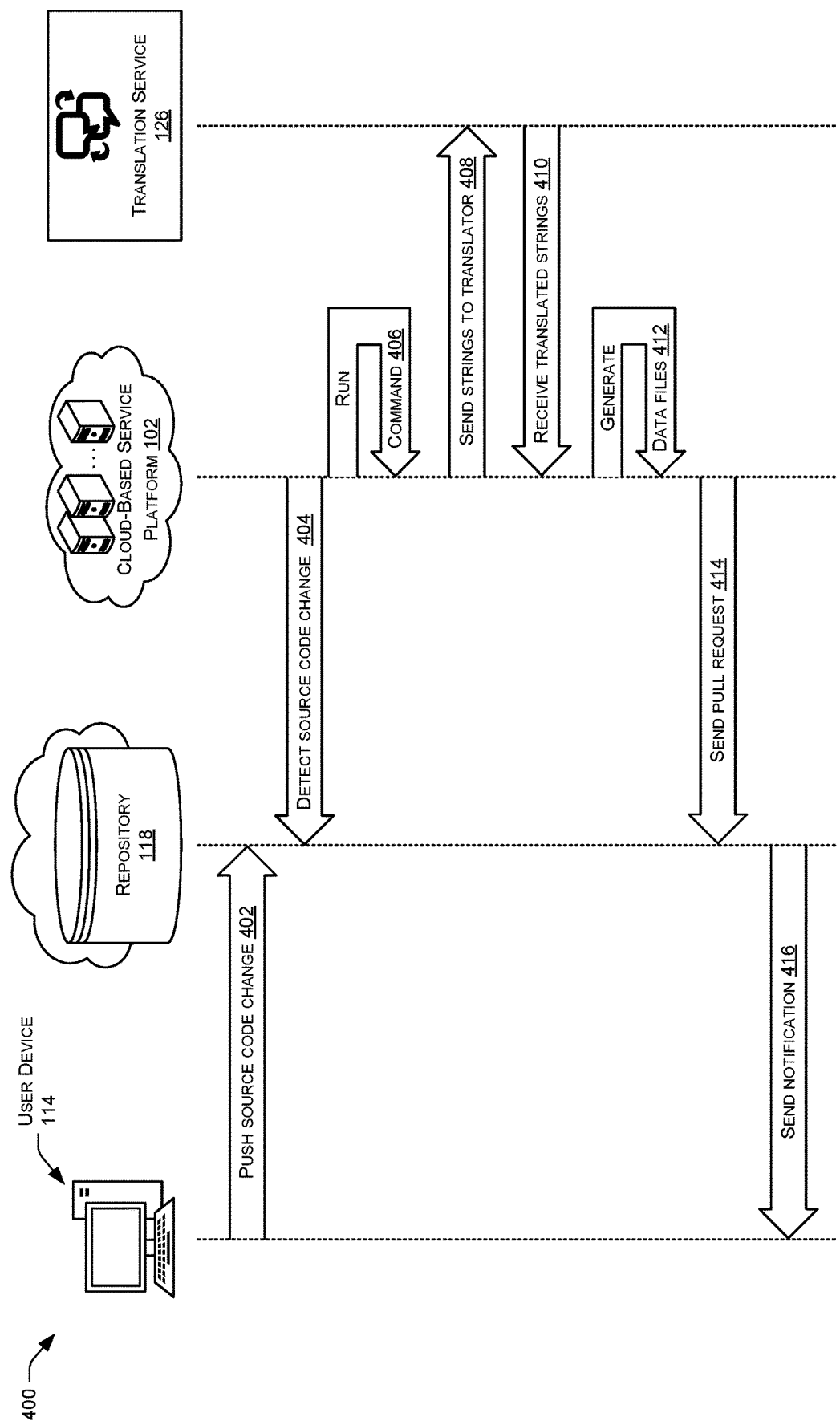
FIG. 4 illustrates a sequence flow diagram showing further example communications between different devices and/or components to automate the translation of strings of an application.

FIG. 4 illustrates a sequence flow diagram 400 showing further example communications between different devices and/or components to automate the translation of strings of an application.

At 402, a user device 114 may push a source code change to a repository 118. In some examples, the change may comprise an addition of source code to the application source code 116, an update/modification to the application source code 116, and/or any other type of change. In some instances, the repository may comprise an application, or other software, development platform that allows developers to host applications, review code, manage projects, and build software (e.g., GitHub, Bitbucket, etc.). In some examples, the repository may simply be a managed database.

At 404, the cloud-based service platform 102 may detect the source code change. For example, the code-build component 214 may determine that the application source code 116 was modified or changed in any way. At 406, at least partly responsive to detecting the change in the application source code 116, the code-build component 214 of the cloud-based service platform 102 may run a command that causes the automated-translation component 212 to being the translation process for the source strings 124.

At 408, the automated-translation component 212 may send the source strings 124 to the translation service 126. In some examples, the source strings 124 may be sent as at least partly in parallel, at least partly serialized, as a batch process, and/or any combination thereof.

At 410, the automated-translation component 212 of the cloud-based service platform 102 may receive the translated strings 128. The translated strings 128 may be in one or more natural languages that were defined by the automated-translation component 212, or may simply be in all of the natural languages that the translation service 126 supports.

At 412, the automated-translation component 212 of the cloud-based service platform 102 may generate one or more translated configuration files 130. Generally, the translated configuration files 130 may include, list, map, etc., translated strings 128 which are in a same natural language.

At 414, the automated-translation component 212 of the cloud-based service platform 102 may send a pull request to the repository 118. Generally, a pull request may cause the repository 118 to, at 416, notify other users or subscribers of the repository 118 to review changes may to the repository. In this way, other users may review the proposed changes, discuss potential modifications, and/or push follow-up commits. If a user 112 approves the changes, the proposed changes (e.g., addition of translated configuration files 130 and/or translated strings 128) may be allowed and the translated configuration files 130 and/or translated strings 128 may be stored in the repository 118.

In some examples, rather than sending the pull request at 414 and the notification at 416, the cloud-based service platform 102 may be permitted or allowed to directly store the translated configuration files 130 and/or translated strings 128 in the repository 118. For instance, the user 112 of the user device 114 may not need to approve of the storage of the translated configuration files 130 and/or translated strings 128, and the cloud-based service platform 102 may be granted permission to store the translated configuration files 130 and/or translated strings 128 directly into the repository 118. However, the translated configuration files 130 and/or translated strings 128 may be stored in any database, and at any location, besides the repository 118 where the source code 116 is stored.

FIGS. 5 and 6 illustrate flow diagrams of example methods 500 and 600 that illustrate aspects of the functions performed at least partly by the cloud-based service platform 102 as described in FIGS. 1-4. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6, and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method for automating the translation of strings of an application from one natural language into one or more other natural languages.

At 502, the cloud-based service platform 102 may provide a computing device with access to a command-line interface (CLI) to receive commands from the computing device. For example, the CLI component 216 may provide the user device 114 with access to a CLI, such as through the account 210. In some examples, the computing device may be provided to any other type of interface, such as an SDK, an API, etc.

At 504, the cloud-based service platform 102 may receive, via the CLI and from the computing device, a command to translate first application strings included in a first data file. For instance, the CLI component 216 may receive a command that is understood, or capable of being processed at least partly by the processors 202. In some examples, the command may comprise an instruction to translate the source strings 124 into a second natural language, and/or additional natural languages. Generally, the first application strings (e.g., source strings 124) may be in a first natural language and be associated with (e.g., normal included in) application source code 116.

At 506, the cloud-based service platform 102 may receive, via the CLI and from the computing device, an indication that the first data file is stored in a repository. For instance, the user 112 may provide parameters associated with the command to translate the first application strings, such as an indication of a storage location (e.g., a directory, a repository 118, a database, or any other storage location) at which the first application files are stored.

At 508, the cloud-based service platform 102 may, at least partly responsive to receiving the command, send, to a translation service, the indication that the first application strings included in the first data file are stored in the repository. For example, the cloud-based service platform 102 may notify the translation service 126 of the storage location of the first application strings. While the first application strings may be in a repository 118, in some examples, the first application strings may be stored local to a user device 114, and/or in another storage location. In some examples, the CLI may be configured to pass along the indication of the storage location of the first application strings directly to the translation service 126.

At 510, the cloud-based service platform 102 may receive, from the translation service 126, second application strings (e.g., translated strings 128) that are in a second natural language. In some examples, individual strings of the second application strings 128 are translations of individual strings of the first application strings 124.

At 512, the cloud-based service platform 102 may generate a second data file including the second application strings. For example, the automated-translation component 212 may generate a translated configuration file 130 that includes translated strings 128 in a same natural language. In some examples, however, a translated configuration file 130 may have two or more natural languages, such as for users who speak multiple natural languages.

At 514, the cloud-based service platform 102 may store the second data file in the repository. For example, the cloud-based service platform 102 may store the translated configuration file 130 in a data store, the repository 118, and/or another location.

In various examples, the source code may comprise first source code, and the process 500 may further comprise detecting that second source code was stored in the repository (e.g., an addition to application source code 116, a modification to application source code 116, etc.). In such examples, based at least in part on detecting the second source code being stored in the repository, the cloud-based service platform 102 may identify a third data file (e.g., translated configuration files 130) including third application strings (e.g., translated strings 128) associated with the second source code. The third application strings may be in the first natural language. Further, the cloud-based service platform 102 may send each of the third application strings to the translation service, and receive, from the translation service, fourth application strings that are in the second natural language. Even further, the cloud-based service platform 102 may generate a fourth data file including the fourth application strings, and store the fourth data file in the repository.

In some examples, prior to storing the second data file in the repository, the cloud-based service platform 102 may receive input to modify an application string of the second application strings. For instance, a user 112 may desire to modify a translated string 128 prior to it being stored and utilized. The user 112 may provide input via their user device 114 to change or modify the translated string 128, such as to clarify the translation. The cloud-based service platform 102 may then generate, based at least in part on the input, a modified application string that takes into account the input, and store the modified application string. In this way, a more sophisticated user 112 may fine-tune the translations of the source strings 124.

FIG. 6 illustrates a flow diagram of another example method 600 for automating the translation of strings of an application from one natural language into one or more other natural languages.

At 602, a cloud-based service platform 102 may identify a first data file including a first string associated with source code of an application. In some examples, the cloud-based service platform 102 may receive, or identify a storage location of, a source configuration firs including a source string 124. The first string may be in a first natural language.

At 604, the cloud-based service platform 102 may detect an event associated with translating the first string from the first natural language into a second natural language. For instance, the cloud-based service platform 102 may detect an event associated with translating the source string 124 into a translated string 128.

In some examples, the cloud-based service platform 102 may provide a computing device with access to a command-line interface (CLI) to receive commands from the computing device, such as through an account 210. In such examples, the cloud-based service platform 102 may detect the event associated with translating the first string by receiving, via the CLI and from the computing device, a command to translate the first application string.

In further examples, the cloud-based service platform 102 may detect that source code was pushed to the repository. In such examples, the event detected by the cloud-based service platform 102 (e.g., automated-translation component 212) may be the source code being pushed to the repository 118.

In additional examples, detecting the event by the cloud-based service platform 102 includes identifying, from a predefined schedule, a time associated with translating application strings associated with the application, for instance, the automated-translation component 212 may determine to periodically, and/or according to a schedule, translate or retranslate source strings 124.

At 606, the cloud-based service platform 102 may cause the first string to be sent to a translation service. For instance, the cloud-based service platform 102 may send a source string 124, or the source configuration file 120, to a translation service 126. In some examples, the cloud-based service platform 102 may provide an indication of a storage location of the first string to the translation service 126, and the translation service 126 may obtain the first string (e.g., receive, fetch, etc.). For instance, the translation service 126 my obtain the first string from a repository 118, from a user device 114, and/or from any other accessible storage location.

At 608, the cloud-based service platform 102 may receive, from the translation service, a second string in the second natural language, the second string being a translation of the first string. As an example, the cloud-based service platform 102 may receive, from the translation service 126, a translated string 128 that is in a second natural language that is a translation of the source string 124.

At 610, the cloud-based service platform 102 may generate a second data file including the second string. For example, the cloud-based service platform 102 may generate a translated configuration file 130 that includes a translated string 128. In some examples, the cloud-based service platform 102 may receive input to modify the second string, and generate, based at least in part on the input, a modified application string. For instance, a user 112 of the user device 114 may modify the translation of the translated strings 128. In such examples, the second data file includes the modified application string.

At 612, the cloud-based service platform 102 may cause the second data file to be stored in a repository associated with the source code of the application. In some examples, the cloud-based service platform 102 may receive, via a CLI and from a computing device, input that specifies a directory of the repository in which to store the second data file. In such examples, the cloud-based service platform 102 may cause the second data file to be stored in the repository comprises causing the second data file to be stored in the directory of the repository.

In further examples, the process 600 may additionally include sending a pull request to a computing device associated with the repository, wherein the pull request prompts the computing device to notify a user account associated with the application that the second data file was stored in the repository.

Additionally, the process 600 may also include analyzing, at the cloud-based service platform 102, a metafile that indicates strings associated with the application that have previously been translated using the translation service, and identifying, from the metafile, a third string that has previously been translated from the first natural language into the second natural language. In such examples, the cloud-based service platform 102 may refrain from sending the third string to the translation service.

Figure 7:
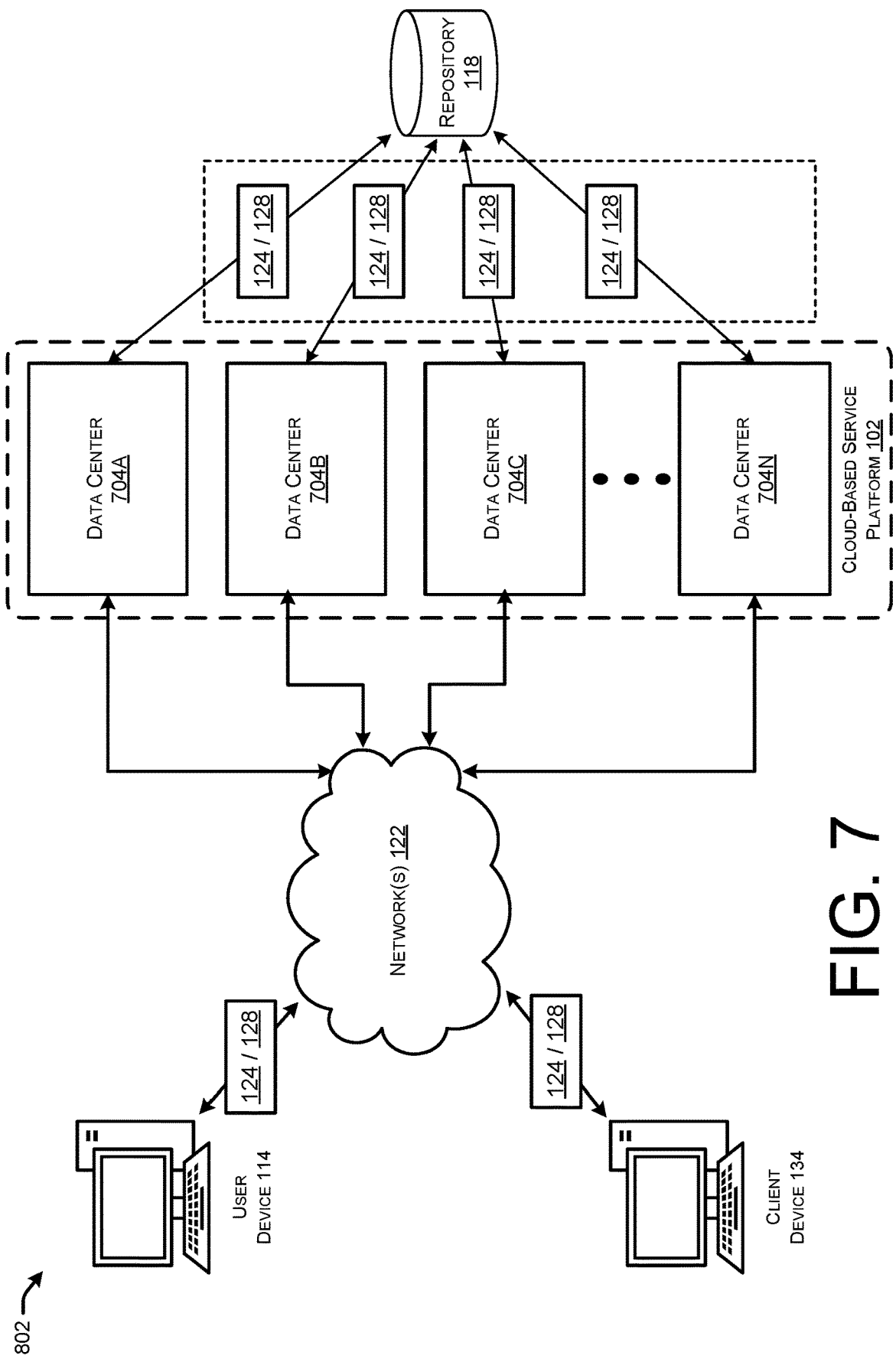
FIG. 7 is a system and network diagram that shows an illustrative operating environment that includes a service provider network that can be configured to implement aspects of the functionality described herein.

FIG. 7 is a system and network diagram that shows one illustrative operating environment 702 for the configurations disclosed herein that includes a cloud-based service platform 102 that can be configured to perform the techniques disclosed herein. The cloud-based service platform 102 can provide computing resources, like VM instances and storage, on a permanent or an as-needed basis. Among other types of functionality, the computing resources 108 provided by the cloud-based service platform 102 may be utilized to implement the various services described above. As also discussed above, the computing resources provided by the cloud-based service platform 102 can include various types of computing resources, such as data processing resources like VM instances, data storage resources, networking resources, data communication resources, network services, and the like.

Each type of computing resource provided by the cloud-based service platform 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud-based service platform 102 can also be configured to provide other types of computing resources not mentioned specifically herein.

The computing resources provided by the cloud-based service platform 102 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative embodiment for a data center 704 that can be utilized to implement the technologies disclosed herein will be described below with regard to FIG. 8.

The data centers 704 may be configured in different arrangements depending on the cloud-based service platform 102. For example, one or more data centers 704 may be included in or otherwise make-up an availability zone. Further, one or more availability zones may make-up or be included in a region. Thus, the cloud-based service platform 102 may comprise one or more availability zones, one or more regions, and so forth. The regions may be based on geographic areas, such as being located within a predetermined geographic perimeter.

The customers and other users 112 of the cloud-based service platform 102 may access the computing resources 108 provided by the cloud-based service platform 102 over any wired and/or wireless network(s) 122, which can be a wide area communication network ("WAN"), such as the Internet, an intranet or an Internet service provider ("ISP") network or a combination of such networks. For example, and without limitation, a user device 114 operated by a customer or other user 112 of the cloud-based service platform 102 may be utilized to access the cloud-based service platform 102 by way of the network(s) 122. It should be appreciated that a local-area network ("LAN"), the Internet, or any other networking topology known in the art that connects the data centers 704 to remote customers and other users can be utilized. It should also be appreciated that combinations of such networks can also be utilized.

As shown in FIG. 7, each of the data centers 704 may include computing devices that included software, such as applications 110, that receive the source strings 124 and/or the translated strings 128 from a data store and/or the repository 118. For instance, the computing devices included in the data centers 704 may include software components which retrieve, receive, or otherwise obtain the source strings 124 and/or translated strings 128 from a data store and/or the repository 118. For example, the data centers 704 may include or store the repository 118, which includes the translated configuration files 130 and/or translated strings 128, as well as the source code 116 and/or source configuration file 120.

Figure 8:
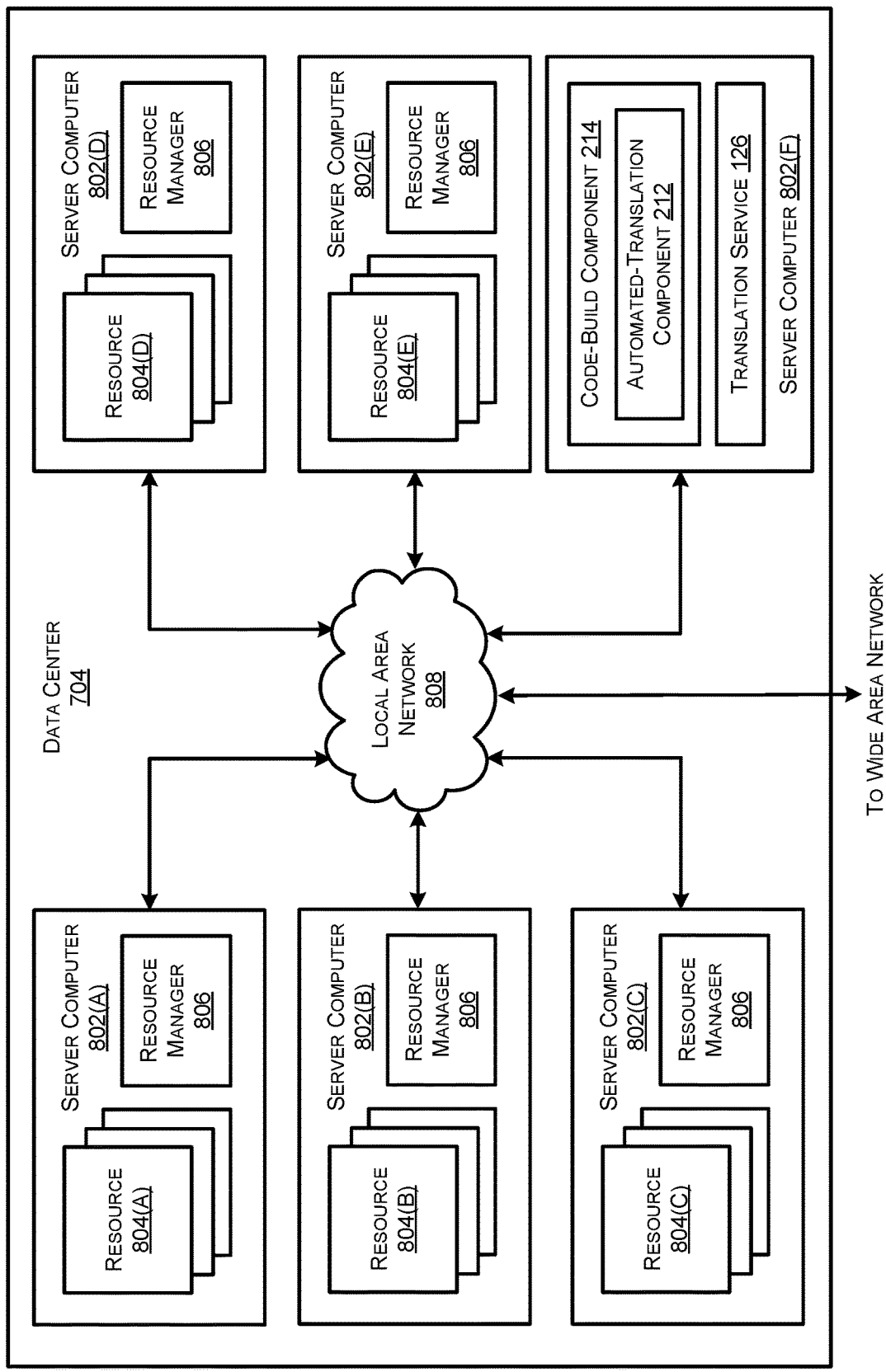
FIG. 8 is a computing system diagram illustrating a configuration for a data center that can be utilized to implement aspects of the technologies disclosed herein.

FIG. 8 is a computing system diagram that illustrates one configuration for a data center 704 that implements aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E. In some examples, the resources 804 and/or server computers 802 may include, or correspond to, the computing resources 108 described herein.

The server computers 802 can be standard tower, rackmount, or blade server computers configured appropriately for providing the computing resources described herein (illustrated in FIG. 8 as the computing resources 804A-804E). As mentioned above, the computing resources provided by the cloud-based service platform 102 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services, some of which are described in detail below with regard to FIG. 8.

The data center 704 shown in FIG. 8 also includes a server computer 802F that can execute some or all of the software components described above. For example, and without limitation, the server computer 802F can be configured to execute components of the cloud-based service platform 102, including the automated-translation component 212, the code-build component 214, and/or the translation service 126, and/or the other software components described above. The code-build component 214 may include, in some examples, the automated-translation component 212. For instance, the automated-translation component 212 may be a sub-component or sub-service of the code-build component 214. The server computer 802F can also be configured to execute other components and/or to store data for providing some or all of the functionality described herein. In this regard, it should be appreciated that the services illustrated in FIG. 9 as executing on the server computer 802F can execute on many other physical or virtual servers in the data centers 804 in various embodiments.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-804N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

As shown in FIG. 8, at least one of the server computers 802(F) may include various components to perform various functionality described herein. For example, server computer 802(F) may include an automated-translation component 212, the code-build component 214, and/or the translation service 126. In some examples, code-build components 214 may detect changes to an application 110 that is executing on a resource 804. (F).

Figure 9:
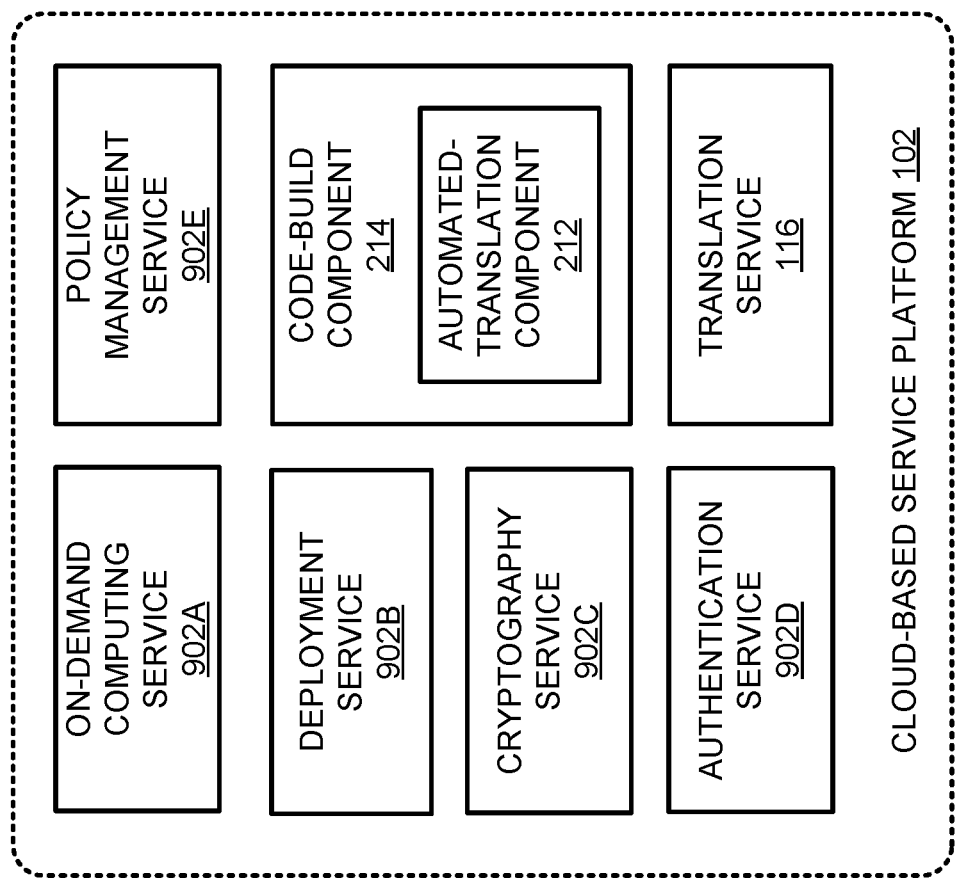
FIG. 9 is a network services diagram that shows aspects of several services that can be provided by and utilized within a system, or a larger system of which the system is a part, which is configured to implement the various technologies disclosed herein.

FIG. 9 is a system and network diagram that shows aspects of several network services that can be provided by and utilized within a cloud-based service platform 102 in one embodiment disclosed herein. In particular, and as discussed above, the cloud-based service platform 102 can provide a variety of network services to customers and other users of the cloud-based service platform 102 including, but not limited to, the automated-translation component 212, the code-build component 214, and the translation service 116. The cloud-based service platform 102 can also provide other types of services including, but not limited to, an on-demand computing service 902A, a deployment service 902B, a cryptography service 902C, an authentication service 902D, and/or a policy management service 902E, some of which are described in greater detail below. Additionally, the service-provider network 104 can also provide other services, some of which are also described in greater detail below.

It should be appreciated that customers of the cloud-based service platform 102 can include organizations or individuals that utilize some or all of the services provided by the cloud-based service platform 102. As described herein, a customer or other user can communicate with the cloud-based service platform 102 through a network, such as the network 122 shown in FIGS. 1 and 7. Communications from a customer computing device, such as the user devices 114 and client device 134138 shown in FIG. 7, to the cloud-based service platform 102 can cause the services provided by the cloud-based service platform 102 to operate in accordance with the described configurations or variations thereof.

It is noted that not all embodiments described include the services described with reference to FIG. 9 and that additional services can be provided in addition to or as an alternative to services explicitly described. Each of the services shown in FIG. 9 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 902A to store data in or retrieve data from a storage service). Additional details regarding some of the services shown in FIG. 9 will now be provided.

As discussed above, the on-demand computing service 902A can be a collection of computing resources configured to instantiate VM instances and to provide other types of computing resources on demand. For example, a customer or other user of the cloud-based service platform 102 can interact with the on-demand computing service 902A (via appropriately configured and authenticated network services API calls) to provision and operate VM instances that are instantiated on physical computing devices hosted and operated by the cloud-based service platform 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 902A is shown in FIG. 9, any other computer system or computer system service can be utilized in the cloud-based service platform 102, such as a computer system or computer system service that does not employ virtualization and instead provisions computing resources on dedicated or shared computers/servers and/or other physical devices.

A storage service (e.g., other services 902F) can include software and computing resources that collectively operate to store data using block or file-level storage devices (and/or virtualizations thereof). The storage devices of the storage service 902F can, for instance, be operationally attached to virtual computer systems provided by the on-demand computing service 902A to serve as logical units (e.g., virtual drives) for the computer systems. A storage device can also enable the persistent storage of data used/generated by a corresponding virtual computer system where the virtual computer system service might only provide ephemeral data storage.

The cloud-based service platform 102 can also include a cryptography service 902C. The cryptography service 902C can utilize storage services of the cloud-based service platform 102, such as the storage service 902F, to store encryption keys in encrypted form, whereby the keys are usable to decrypt customer keys accessible only to particular devices of the cryptography service 902C. The cryptography service 902C can also provide other types of functionality not specifically mentioned herein.

As illustrated in FIG. 9, the cloud-based service platform 102, in various embodiments, also includes an authentication service 902D and a policy management service 902E. The authentication service 902D, in one example, is a computer system (i.e., collection of computing resources) configured to perform operations involved in authentication of users. For instance, one of the services 902 shown in FIG. 9 can provide information from a user to the authentication service 902D to receive information in return that indicates whether or not the requests submitted by the user are authentic.

The policy management service 902E, in one example, is a network service configured to manage policies on behalf of customers or internal users of the cloud-based service platform 102. The policy management service 902E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The cloud-based service platform 102 can additionally maintain other services 902F based, at least in part, on the needs of its customers. For instance, the cloud-based service platform 102 can maintain a deployment service 902B for deploying program code and/or a data warehouse service in some embodiments. Other services include object-level archival data storage services, database services, and services that manage, monitor, interact with, or support other services. The cloud-based service platform 102 can also be configured with other services not specifically mentioned herein in other embodiments. The cloud-based service platform 102 can additionally maintain and provide services described herein, such as the automated-translation component 212, the code-build component 214, and/or the translation service 116. Functionality of these components are described above, and throughout.

Figure 10:
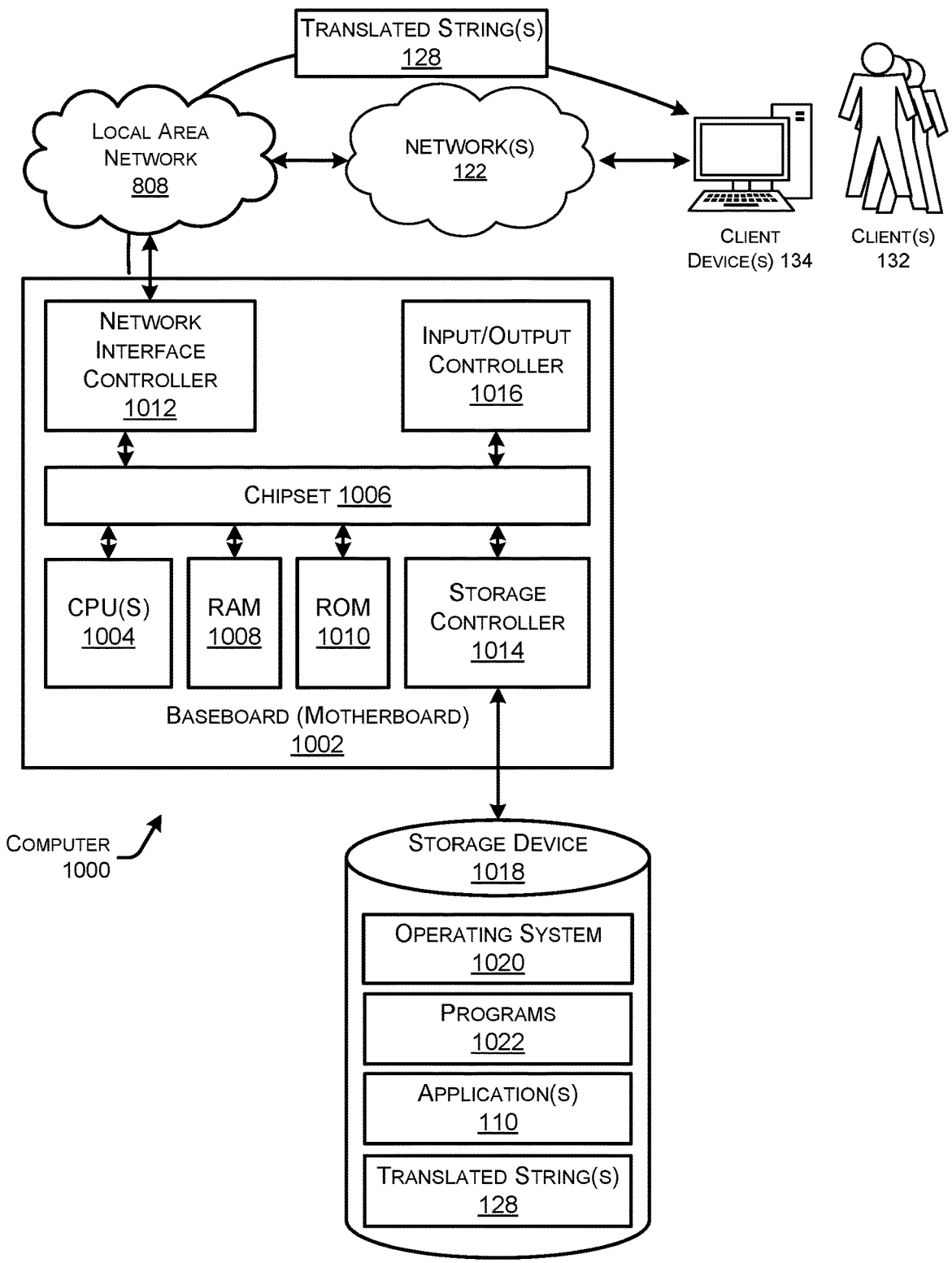
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 808. The chipset 1006 can include functionality for providing network connectivity through a NIC 1012, such as a gigabit Ethernet adapter. The NIC 1012 is capable of connecting the computer 1000 to other computing devices over the network 808 (or 122). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020 (e.g., operating systems 116(1)-(N)), programs 1022 (e.g., agents, etc.), and data, applications(s) 110, and/or translated string(s) 128, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the cloud-based service platform 102, and or any components included therein, may be supported by one or more devices similar to computer 1000. Stated otherwise, some or all of the operations performed by the cloud-based service platform 102, and or any components included therein, may be performed by one or more computer devices 1000 operating in a cloud-based arrangement.

In some examples, the source configuration file 120, translated configuration files 130, translated strings 128, and/or application source code 116 may be stored locally on the client devices 134. For instance, in examples where the client devices 134 download an application from a computing device 1000, and/or another location (e.g., the computer 1000 includes, or is associated with, repository 118), the client devices 134 may download the source application source code 116 to execute the application, as well as the source configuration file 120, source strings 124, translated configuration files 130, and/or translated strings 128. For instance, the client devices 134 may download all of those files, and/or only certain files depending on the natural language of the clients 132.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-6. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

As shown in FIG. 10, the computer 1000 may receive, retrieve, or otherwise obtain the translated strings 128 from the cloud-based service platform 102. The computer 1000 may then store the translated strings 128 on the operating system 1020, the application(s) 110, and/or the programs 1022 that are stored in the storage device 1018 to update or otherwise modify the operating system 1020 and/or the programs 1022 (e.g., application(s) 110).

Further, the computer 1000 may then determine that a client device 134 is interacting with the application(s) 110 and requires use of one of the translated strings 128. The computer 1000 may provide the appropriate translated string(s) 128 as embedded in the application(s) 110 source code 116 such that the client device 134 presents text in an appropriate natural language for the client 132.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed, cause the one or more processors to perform operations comprising:
   providing a computing device with access to a command-line interface (CLI) to receive commands from the computing device, the computing device being associated with an application developer;
   receiving, via the CLI and from the computing device, an indication that source code of an application was at least one of modified or pushed to a repository;
   at least partly responsive to receiving the indication, sending, to a translation service, a request to translate first application strings from a first natural language to a second natural language, the first application strings associated with the source code of the application and included in a first data file stored in the repository;
   receiving, from the translation service, second application strings that are in the second natural language, wherein individual strings of the second application strings are translations of individual strings of the first application strings;
   generating a second data file including the second application strings; and
   storing the second data file in the repository.

2. The system of claim 1, wherein the source code comprises first source code, the operations further comprising:
   detecting that second source code was stored in the repository;
   based at least in part on detecting the second source code being stored in the repository:
      identifying a third data file including third application strings associated with the second source code, wherein the third application strings are in the first natural language;
      causing each of the third application strings to be sent to the translation service;
      receiving, from the translation service, fourth application strings that are in the second natural language;
      generating a fourth data file including the fourth application strings; and
      storing the fourth data file in the repository.

3. The system of claim 1, the operations further comprising, prior to storing the second data file in the repository:
   receiving input to modify an application string of the second application strings; and
   generating, based at least in part on the input, a modified application string,
   wherein the second data file includes the modified application string.

4. A computer-implemented method comprising:
   identifying a first data file including a first string associated with source code of an application, the first string being in a first natural language;
   identifying, from a predefined schedule, a time associated with translating the first string associated with the source code of the application;
   determining, based at least in part on identifying the time, to translate the first string from the first natural language into a second natural language;
   causing the first string to be sent to a translation service;
   receiving, from the translation service, a second string in the second natural language, the second string being a translation of the first string;
   generating a second data file including the second string; and
   causing the second data file to be stored in a repository associated with the source code of the application.

5. The computer-implemented method of claim 4, further comprising:
   providing a computing device with access to an interface to receive commands from the computing device,
   receiving, via the interface and from the computing device, a command to translate the first application string.

6. The computer-implemented method of claim 5, further comprising:
   receiving, via the interface and from the computing device, input that specifies a directory of the repository in which to store the second data file,
   wherein the causing the second data file to be stored in the repository comprises causing the second data file to be stored in the directory of the repository.

7. The computer-implemented method of claim 4, further comprising detecting that at least one of a portion of the source code was pushed to the repository or a portion of the first data file was pushed to the repository.

8. The computer implemented method of claim 4, further comprising:
   providing a computing device with access to an interface to receive commands from the computing device; and
   receiving, from the computing device and via the interface, the predefined time.

9. The computer-implemented method of claim 4, further comprising, prior to causing the second data file to be stored in the repository:
   receiving input to modify the second string; and
   generating, based at least in part on the input, a modified application string,
   wherein the second data file includes the modified application string.

10. The computer-implemented method of claim 4, further comprising:
    sending a pull request to a computing device associated with the repository, wherein the pull request prompts the computing device to notify a user account associated with the application that the second data file was stored in the repository.

11. The computer-implemented method of claim 4, further comprising:
    analyzing a metafile that indicates strings associated with the application that have previously been translated using the translation service;
    identifying, from the metafile, a third string that has previously been translated from the first natural language into the second natural language; and
    refraining from sending the third string to the translation service.

12. A system comprising:
one or more processors; and
one or more computer-readable media storing computer-executable instructions that, when executed, cause the one or more processors to perform operations comprising:
   monitoring a repository that stores first source code of an application;

detecting a trigger event associated with second source code being stored in the repository, the trigger event comprising at least one of:
- an update to the first source code to generate the second source code; or
- an addition of the second source code to the repository;

identifying a first data file including a first string associated with first source code of an application, the first string being in a first natural language;

based at least in part on detecting the trigger event, causing the first string to be sent to a translation service;

receiving, from the translation service, a second string in a second natural language, the second string comprising a translation of the first string;

generating a second data file including the second string; and causing the second data file to be stored in a repository.

13. The system of claim 12, wherein:
the trigger event comprises the update to the first source code to generate the second source code; and
the first string comprises an updated version of a third string that was updated based at least in part on the update to the first source code.

14. The system of claim 12, wherein:
the trigger event comprises the addition of the second source code to the repository; and
the first string comprises an added application string included in the second source code.

15. The system of claim 12, the operations further comprising:
identifying, from a predefined schedule, a predefined time associated with translating a third string from the first natural language into the second natural language;
based at least in part on the predefined time, sending the third string to a translation service; and
receiving, from the translation service, a fourth string in the second natural language, the fourth string comprising a translation of the third string.

16. The system of claim 12, the operations further comprising, prior to causing the second data file to be stored in the repository:
sending the second string to a device associated with a user; and
receiving a modified application string that is a modified version of the second string,
wherein the second data file includes the modified application string.

17. The system of claim 12, the operations further comprising analyzing a metafile to identify the repository as a storage location at which to store the second data file.

18. The system of claim 12, further comprising:
analyzing a metafile that indicates strings associated with the application that have previously been translated using the translation service;
identifying, from the metafile, a third string that has previously been translated from the first natural language into the second natural language; and
refraining from sending the third string to the translation service.

19. The system of claim 12, the operations further comprising:
providing a computing device with access to a command-line interface (CLI) to receive commands from the computing device; and
receiving, via the CLI and from the computing device, input that specifies a directory of the repository in which to store the second data file,
wherein the causing the second data file to be stored in the repository comprises causing the second data file to be stored in the directory of the repository.

20. The system of claim 12, the operations further comprising:
receiving input from a user account associated with the application; and
analyzing the user input to determine a user preference associated with translating the first string from the first natural language into the second natural language.

\* \* \* \* \*